Aug. 9, 1927.  
J. C. CARLTON  
1,638,655  
RADIAL DRILL COLUMN CLAMP CONTROL  
Filed Jan. 7, 1926  
2 Sheets-Sheet 1

Inventor:
Jack C. Carlton
By Wood + Wood
Attorneys

Aug. 9, 1927.

J. C. CARLTON 1,638,655

RADIAL DRILL COLUMN CLAMP CONTROL

Filed Jan. 7, 1926  2 Sheets-Sheet 2

Inventor:
Jack C. Carlton
By
Wood & Wood
Attorneys

Patented Aug. 9, 1927.

1,638,655

UNITED STATES PATENT OFFICE.

JACK C. CARLTON, OF CINCINNATI, OHIO, ASSIGNOR TO THE CARLTON MACHINE TOOL COMPANY, OF CINCINNATI, OHIO, A CORPORATION OF OHIO.

RADIAL-DRILL COLUMN-CLAMP CONTROL.

Application filed January 7, 1926. Serial No. 79,834.

This invention relates to improvements in machine tools, and is particularly directed to an electro-magnetic controlled device for operating the clamping mechanism of a rotatable column or sleeve of a radial drill.

The invention is shown applied to that form of column clamp or friction clutch mechanism, described in the patent to Jack C. Carlton for "friction clutch", Patent No. 1,557,241, Oct. 13, 1925.

A general object is to operate the column clamping mechanism of a radial drill or equivalent clamping mechanism, by means of the movable core or armature of an electro-magnet, the core being connected with the clamping mechanism in a manner to operate said mechanism in a predetermined manner when the core is moved in either direction. By the use of a device of this kind, the clamping mechanism can be electrically controlled for clamping and releasing operations.

A specific object is to clamp the column of a radial drilling machine against rotation during a drilling operation by the gravitational action of a magnet armature, so that clamping power is applied as the armature drops, after deenergization of the magnet. Thus the magnet is energized only for releasing the clamping mechanism during those shorter periods when the drilling arm is to be swung to another position, and electric power is used for short periods only.

Other objects and certain advantages and features of the invention will be disclosed in the description of the drawings forming a part of this application and in said drawings.

Figures 1, 2:
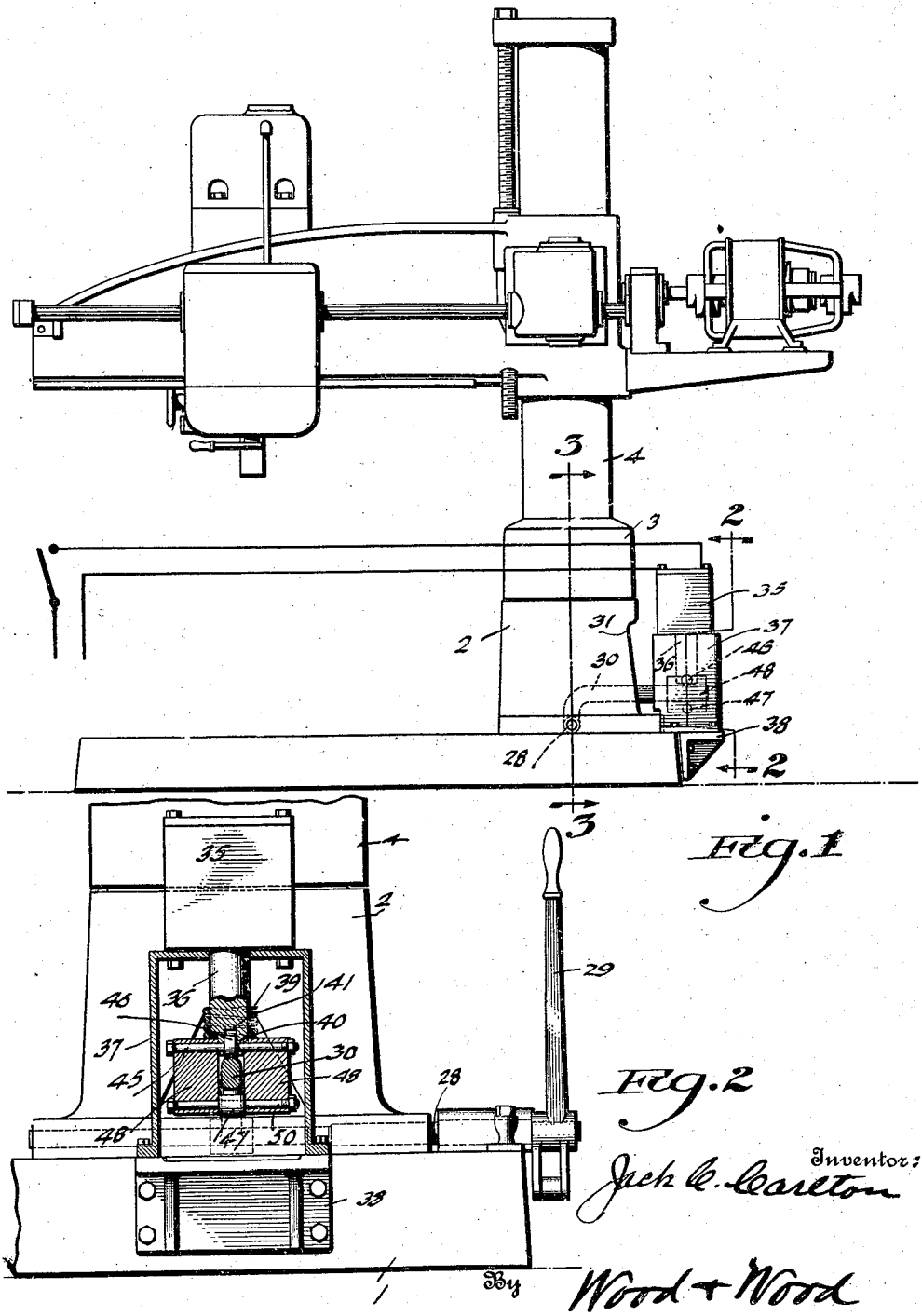
Figure 1 is a general view of a radial drill, including a column clamping mechanism showing my invention applied for operating said mechanism.
Figure 2 is a vertical section on line 2—2, Figure 1.

The invention primarily is to provide an electric control for the clamping mechanism of a rotatable column or radial arm carrying sleeve of a radial drill, adapting the operator to quickly release and clamp the column or arm at a point remote from the column clamping mechanism for a swinging adjustment of the arm without being required to leave his work station as when he is using the drill with the head stock at the outer end of the arm. In this capacity any form of electric circuit controlling or push button type of switch may be stationed at any convenient point on the drill for controlling the circuit to an electric magnet operating the clamping or clutch mechanism for the column. The armature or the magnet in the present instance is mounted upon the end of a friction clamp operating lever, as a weight therefor for operating the lever when the magnet is deenergized so that the column is normally clamped against rotation, and released when the magnet is energized, which is only periodically for a short interval, sufficient to shift the arm of the drill.

The drill and column clamping mechanism may represent various commercial forms of construction, and any type of clamping mechanism capable of operation through the release of a weight or the equivalent and which will permit or offer no interference to the ordinary manual control with which the machine is equipped. With the magnetic or electric control only effective for obtaining a temporary release of the clamping mechanism sufficient for making an adjustment of the arm, the electric current consumption necessary for a control is reduced to a minimum.

The construction of drill and clamping mechanism for the arm sleeve or rotatable column, disclosed, represents a commercial type with a friction clamp as shown in the aforesaid application as a form of machine to which the present invention can be applied as an accessory or attachment. Therefore such parts of drill organization as are included in the commercial machine will only herein be described in sufficient detail necessary for a clear understanding of the operation of the present invention and in so far as the same may combine with the elements of the drill and clamping mechanism to produce an operative combination.

Referring to the drawings, 1 indicates the base plate of a machine tool, and mounted upon the base is a vertical column 2 of hollow construction. The column at the upper part of its pedestal portion is counter-turned to telescopically or concentrically receive the hub 3 of the drill arm carrying sleeve 4, to provide a recess or pocket between the column and hub of the sleeve for the reception of the friction clamping elements; and to provide a shoulder 6 upon the column, as a support for the clamping elements. The column below the shoulder is annularly grooved as at 8 to receive the ends of screws 9 engaged through the hub, for securing the sleeve upon the column against vertical displacement but permitting the sleeve to swivel or swing about the column. Friction rollers 12 have their axes disposed vertically between the periphery of the column and in the inner surface of the hub. This column construction per se does not necessarily form a part of this invention, but is shown as a basis of illustration for the clamping mechanism, which mechanism can be of any preferred form.

The friction clamping mechanism interposed between the column and the hub of the sleeve, comprises a series of crescent shaped members, 15, 16, 17. The crescent shaped member 15 has its outer surface concentric with the inner surface of the hub 3 of the sleeve 4, and its inner surface eccentric thereto. The opposite ends of this member 15 overlap the tapered ends of opposingly related crescent or segmental wedge members 16, 17. The member 15 is held against circumferential sliding motion by a key 18. The inner surfaces of the members 16, 17, are concentric with the outer surface of the column 2, and are eccentric to the inner surface of the member 15. When the members 16, 17 are moved in expanding or opposite directions their ends are wedged between the outer periphery of the column and the inner surface of the wedge member 15, and frictionally clamp the parts together.

Figure 4:
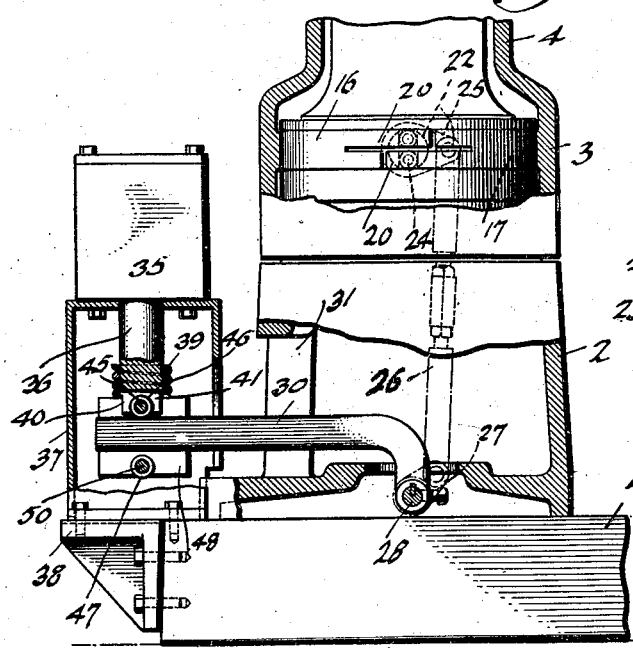
Figure 4 is a vertical section on line 4—4, Figure 3, further illustrating the clamping means and elements for operating the same as well as the connection of the operating elements with the solenoid.
Figure 5:
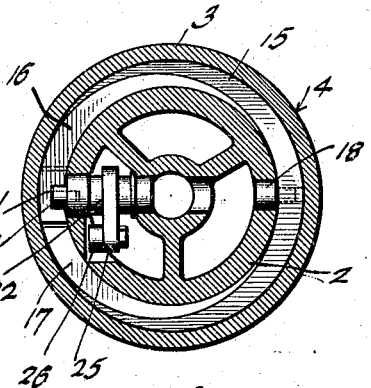
Figure 5 is a horizontal section on line 5—5, Figure 3, showing the friction clamp for binding or clamping the column or sleeve to the base.
Figure 3:
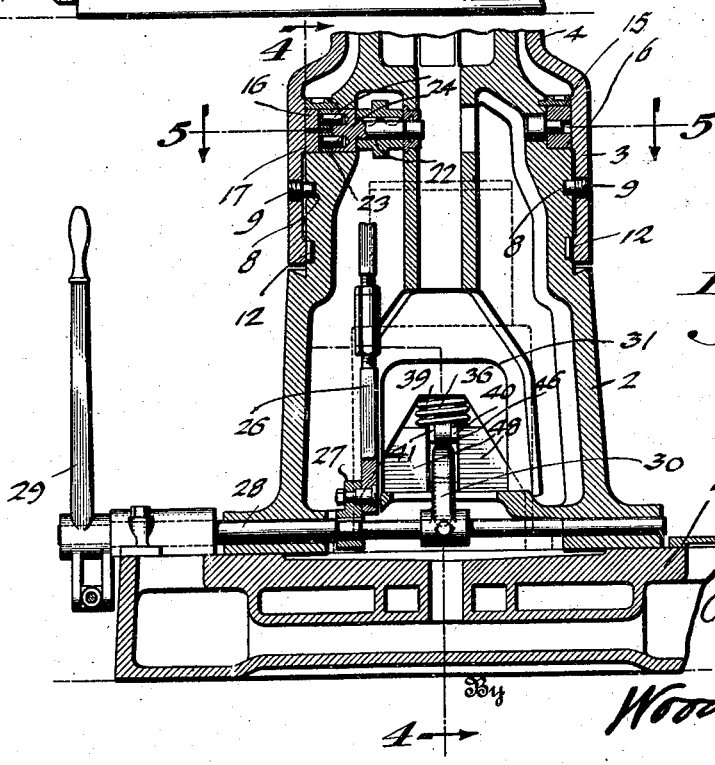
Figure 3 is a vertical section through the column on line 3—3, Figure 1, showing the column clamping means and link and rock shaft elements for operating the same.

The adjacent ends of the members 16, 17, are each provided with a tongue 20, said tongue adapted to overlap as shown in Figure 4, and to provide portions for connecting with the crank shaft. The tongues have their inner sides notched as at 21, to receive a roller 23 mounted upon a pin 24 engaged in bores in the end of the crank shaft 22, the crank shaft being journaled in the bearings in the column. A sleeve is keyed to the crank shaft, and has a crank arm 25 extending radially therefrom. When the shaft is rotated, the pins move in opposite direction and the members 16, 17, are correspondingly moved, either to clamping or de-clamping positions. The crank shaft is oscillated by means of a link 26 extending downwardly within the pedestal, and this link is connected to an arm 27 extending from a horizontal rock shaft 28. The outer end of this rock shaft is provided with a hand lever 29 by which the clamps may be operated if desired.

My invention consists however, in operating the rock shaft by means of an electromagnetic device, and for this purpose an arm 30 is keyed to the rock shaft 28 and extends outwardly freely through an opening 31 in the pedestal 2. The outer end of this arm is flexibly connected with the projecting weighted core of an electro-magnetic solenoid.

Any preferred connections between the movable core of the solenoid, and the clamping mechanism can be used, but the connection herein illustrated and described has been found most effective.

The solenoid can be of any preferred type or make, and comprises a coil 35 and a movable core 36. The solenoid is vertically disposed, and mounted on a hollow frame 37, which is clamped to the base 1 and to a bracket 38 extending laterally from the side of the base. This vertical disposition of the solenoid permits the core 36 to drop by gravity when the solenoid is deenergized. In order to positively loosen the core to obtain an acceleration of its gravitational movement, a compression spring 39 is interposed between the coil and the lower end of the core.

The core is preferably weighted, and the weight is removably attached to a counter-turn portion 40 at its lower end. This weight also acts as a means for establishing loose connection between the core and the column clamp operating means. The counter-turned portion of the core is diametrically slotted as at 41 and the weight of the two part construction is attached to this counter-turned portion in the following manner:

One section of the weight is disposed at each side of the counter-turned portion and the weight sections are thus spaced apart, for the reception of the outer end of the clamping mechanism operating lever 30. A rod 45 traverses the weights and counter-turned portion 40 and a roller 46 is journaled upon this rod and is rotatable within the slot. A second roller 47 is interposed between the weight sections 48 near the lower end, and is journaled upon the tie rod 50 passing through the sections. The rollers are spaced apart and an opening is formed between the weight sections, into and through which the outer end of the lever 30 extends. The rollers act as anti-friction devices and engage the lever at opposite sides to raise and lower the same. Thus, the core is connected with the clamping operating mechanism for the gravity operation of the mechanism when the core is released, by deenergization of the coil.

The application of my clamp operating device in a radial drill is particularly advantageous, inasmuch as the solenoid can be controlled from a distant point convenient to the operator, and further, considerable electric power is saved by utilizing the gravitational force of the core to clamp the arm carrying sleeve during a drilling operation, thus only using electric power to release the clamp by raising the core, and holding the clamp released while the tool is being brought to a new position.

Having described my invention, I claim:

In a radial drill, a column, an arm carrying sleeve concentrically engaged about and rotatable upon the column, frictional clamping means interposed between the column and sleeve for rigidly binding said parts together, a rock shaft at the base of the column, connections between said rock shaft and clamping means for actuating said clamping means, a lever arm fixed to the rock shaft, a weight loosely engaged upon said lever arm for depressing said lever arm and maintaining said clamping means in active position for binding the column and sleeve, and an electromagnet having an armature engaging with said weight for operating said arm when the magnet is energized, releasing the binding engagement of the friction means with the column and sleeve.

In witness whereof, I hereunto subscribe my name.

JACK C. CARLTON.